(12) United States Patent
Bauer et al.

(10) Patent No.: US 10,680,551 B2
(45) Date of Patent: Jun. 9, 2020

(54) CABLING METHOD

(71) Applicant: SIEMENS AKTIENGESELLSCHAFT, München (DE)

(72) Inventors: Petra Bauer, München (DE); Peter Fige, München (DE)

(73) Assignee: Siemens Aktiengesellschaft, München (DE)

( * ) Notice: Subject to any disclaimer, the term of this patent is extended or adjusted under 35 U.S.C. 154(b) by 754 days.

(21) Appl. No.: 14/772,645

(22) PCT Filed: Feb. 13, 2014

(86) PCT No.: PCT/EP2014/052771
§ 371 (c)(1),
(2) Date: Sep. 3, 2015

(87) PCT Pub. No.: WO2014/135348
PCT Pub. Date: Sep. 12, 2014

(65) Prior Publication Data
US 2016/0294321 A1   Oct. 6, 2016

(30) Foreign Application Priority Data
Mar. 4, 2013  (DE) .................. 10 2013 203 647

(51) Int. Cl.
*H02S 40/36* (2014.01)
*G06Q 10/04* (2012.01)

(52) U.S. Cl.
CPC ............. *H02S 40/36* (2014.12); *G06Q 10/04* (2013.01)

(58) Field of Classification Search
CPC .................................. H02S 40/36; G06Q 10/04
See application file for complete search history.

(56) References Cited

U.S. PATENT DOCUMENTS 6,721,414 B1 *  4/2004  Rojas ................... H04M 3/229
                                                       370/254
8,831,920 B2 *  9/2014  Logatoc .............. G06F 17/5004
                                                       703/6

(Continued)

FOREIGN PATENT DOCUMENTS

DE      10031557A1 A1    1/2002
DE   102005020129A1 A1   11/2006

OTHER PUBLICATIONS

German Office Action for related German Application No. 10 2013 203 647.7, dated Jan. 13, 2014, with English Translation.

(Continued)

*Primary Examiner* — Rehana Perveen
*Assistant Examiner* — Steven W Crabb
(74) *Attorney, Agent, or Firm* — Lempia Summerfield Katz LLC (57) ABSTRACT

A method determines a cabling of a unit of a photovoltaic system. The unit includes a number of solar components and a transfer point. The method includes generating a cabling chart with paths between a connection of each solar component and the transfer point according to cable routing regulations, determining preferred paths of each solar component to the transfer point based on the cabling charts, and selecting one of the determined paths for each solar component such that the cabling complexity for the unit is minimized. In the process, the cabling complexity is determined based on the sum of the lengths of the selected paths and the length of a cable channel in which the cables run individually or in a bundled manner.

16 Claims, 5 Drawing Sheets

(56) References Cited

U.S. PATENT DOCUMENTS

| | | |
|---|---|---|
| 2005/0210434 A1 | 9/2005 | Rouch et al. |
| 2006/0243318 A1 | 11/2006 | Feldmeier et al. |
| 2007/0038415 A1 | 2/2007 | Okada et al. |
| 2007/0260432 A1* | 11/2007 | Okada ................. G06F 17/5004 703/1 |
| 2009/0031259 A1* | 1/2009 | Gray ................... G06F 17/5068 716/132 |
| 2010/0153892 A1* | 6/2010 | Gray ................... G06F 17/5068 716/103 |
| 2011/0015900 A1 | 1/2011 | Minot |
| 2014/0117768 A1* | 5/2014 | Goyal .................... H01L 31/05 307/77 |

OTHER PUBLICATIONS

PCT International Search Report and Written Opinion of the International Searching Authority dated Apr. 3, 2014 for corresponding PCT/EP2014/052771.

* cited by examiner

CABLING METHOD

The present patent document is a § 371 nationalization of PCT Application Serial Number PCT/EP2014/052771, filed Feb. 13, 2014, designating the United States, which is hereby incorporated by reference in its entirety. This patent document also claims the benefit of DE 10 2013 203 647.7, filed on Mar. 4, 2013, which is also hereby incorporated by reference in its entirety.

FIELD

The disclosed embodiments relate to a cabling method and to a method for the determination of an optimum routing of cables in a photovoltaic installation.

BACKGROUND

A photovoltaic installation is divided into one or more units. Each unit includes a number of solar components and a transfer point. The solar components may be configured e.g. as solar modules, each of which includes a number of solar cells with a glazed cover panel and a mounting frame. In other forms, the solar components may be configured differently, for example in the form of a number of solar modules or a number of solar cells. The solar components may be secured rigidly in a predetermined orientation, or may be arranged to track the position of the sun, either individually or in combination. In the case of a stationary arrangement of solar components, the transfer points of units observe a uniform pattern, and there is no variation in the design of units, such that the routing of cables within each unit may be arranged in a uniform manner.

However, where solar components track the sun, a grouping of solar components is governed, not only by electrical criteria, but also by mechanical criteria. The object, for example, is that as many solar components as possible should track the sun via a common drive system. Tracking involves the rotation of solar components around an axis.

Accordingly, the grouping of solar components in the units of a photovoltaic installation may pose a complex problem. The routing of cables between the solar components and a transfer point in each unit also poses a subsidiary problem. In general, the solar components of each unit are arranged individually, and an individual transfer point is provided. The laying of cables is governed by rules, for example, solar components may be quadrilateral, whereby cables are only to be laid parallel to the edges of solar components. Accordingly, the edges of solar components are arranged in parallel pairs, such that cables may only be routed in two directions, at right-angles to each other. A further rule may dictate that cables are only to be laid outside the perimeter of solar components. In a large photovoltaic installation, horizontally-routed cable sections are embedded in the ground. To this end, cable ducts are provided, for the accommodation of one or more cables, running from one of the solar components to the transfer point.

For electrical reasons, the cables between the individual solar components and the transfer point of each unit are kept as short as possible. At the same time, expenditure for the provision of cable ducts is kept as low as possible, in order to save costs.

For an individual unit in the photovoltaic installation, this problem is resolved forthwith by the execution of a first act, in which all potential cabling options are constituted in accordance with existing rules, and a second act for the selection of those cabling options that provide the optimum fulfillment of the criteria specified. An exhaustive optimization of all the cable routing options constituted may be executed, for example, via a mixed-integer program, which identifies an optimum solution.

However, the workload associated with the determination of optimum cable routes for several tens, several hundred or even several thousand units may be so great that even a state-of-the art computing facility is not capable of defining optimized solutions for all units within an acceptable time. Accordingly, a run-through of multiple planning variants for a planned photovoltaic installation, or a rapid response to a change in project requirements, is not possible.

SUMMARY AND BACKGROUND

The scope of the present invention is defined solely by the appended claims and is not affected to any degree by the statements within this summary.

The present embodiments may obviate one or more of the drawbacks or limitations in the related art. For example, the disclosed embodiments may provide a method for the determination of a cabling of a unit in a photovoltaic installation, which permits the rapid identification of an optimum solution using modest resources.

A method for the determination of a cabling of a unit in a photovoltaic installation, in which the unit includes a number of solar components and a transfer point, includes generating a cabling chart with paths between a connection of each solar component and the transfer point, in accordance with specified cable routing regulations, and determining, based on the cabling chart, of preferred paths between each solar component and the transfer point, and selecting one of the paths thus determined for each solar component such that a workload associated with the cabling of the unit is minimized to the greatest possible extent. To this end, the cabling workload is determined based on a sum of the lengths of the selected paths and the length of a cable duct in which the cables are routed, either individually or in a bundled arrangement.

By considering both cable lengths and the length of the cable duct, a successful compromise for optimization, in both technical and economic terms, may be defined. The definition of preferred paths provides (e.g., ensures) that, from the large number of potential paths available, the preferred paths chosen are those likely to be applied in an effective solution. In the interest of reducing the complexity of the optimization process, less probable paths may be discarded at an early stage, thereby permitting the definition of cabling with an acceptable workload. Specifically, if the method is to be executed for multiple units in the photovoltaic installation, the efficiency of this method may contribute to the improvement of the planning of the photovoltaic installation as a whole, for example, with respect to variations or changing requirements, and may also be executed a number of times.

Solar components may be provided with a number of alternative connections. Accordingly, the cabling chart may be plotted between all these alternative connections and the transfer point. For example, a solar module that combines a number of solar cells in a manageable unit may be provided with two connections that are arranged opposite each other and may be used alternatively. By considering all the potential links between both connections and the transfer point, the structural freedom associated with the provision of multiple connections may be exploited in an optimum manner. Although the resulting increase in the number of potential paths from a solar component to the transfer point increases the complexity of the optimization process to be executed subsequently, the heuristic selection of preferred paths may result in a converse reduction in this complexity, thereby permitting optimization to be executed with an acceptable workload.

In one embodiment, the edges of all paths are routed either in a first direction or in a second direction. These two directions are arranged at right angles to each other, and the directions run parallel to the edges of the quadrilateral solar components. The observation of these and other cable routing regulations generates a sustainable improvement in the serviceability of the unit. This restriction may also simplify the issue of cable routing. For the selection of preferred paths, various principles are available, which may be applied either individually or in combination.

In one embodiment, the preferred paths are determined as the shortest path in relation to the predetermined edge weights of edges on the path. This allows Dijkstra's algorithm, or one of the further developments and variants thereof, to be applied for the determination of a shortest path in the cabling chart.

Edge weights may be determined based on a Euclidian distance in respect of their end points or end nodes. By this method, a short cable length between a solar component and the transfer point may be achieved in a straightforward and easily determined manner.

In one variant, in which the edges, as described above, are routed either in a first or in a second direction, the edge weights may additionally be determined based on edge lengths arranged in the first direction. By this method, for example, a north-south orientation of edges may be assigned a stronger value.

In one embodiment, the edges oriented in the second direction may also be determined, rather than the edges oriented in the first direction. By this method, for example, an east-west orientation of edges may be assigned a stronger value. The edges oriented in both directions may also be evaluated, in order to achieve a realistic dimension for the length of cable between the solar components and the transfer point.

The heuristics specified above may be applied in combination with an additional penalty for edge weights, where an edge lies within a specific area that borders the unit. In the case of multiple and adjoining units, the mutual influence of units associated with cables or cable ducts may therefore be excluded or prevented. However, such a cable routing may be permitted, if the resulting benefit is sufficiently great.

In one embodiment, the selection of heuristically selected paths is achieved via mixed-integer optimization. Standard solutions are available for mixed-integer optimization, which run on conventional processing devices and are easily adapted to the issue under consideration. Mixed-integer optimization permits the execution of effective optimization using various methods and devices.

In one embodiment, selection involves an exact optimization method such as branch-and-bound, the cutting-plane method, or branch-and-cut. An optimum solution may be achieved in each case. Ultimately, although the optimization method may involve a heavier workload than a pure optimization method only, this additional workload is acceptable, on the grounds that the fundamental sampling volume selected based on the the above-mentioned heuristic is sufficiently small.

A computer program product according to one aspect of the disclosure incorporates program code for the execution of the methods described. The computer program product includes one or more non-transitory computer-readable storage media having stored thereon instructions executable by one or more processors of a computing system. Execution of the instructions causes the computing system to perform operations corresponding with the acts of the method described herein.

DETAILED DESCRIPTION

Figure 1:
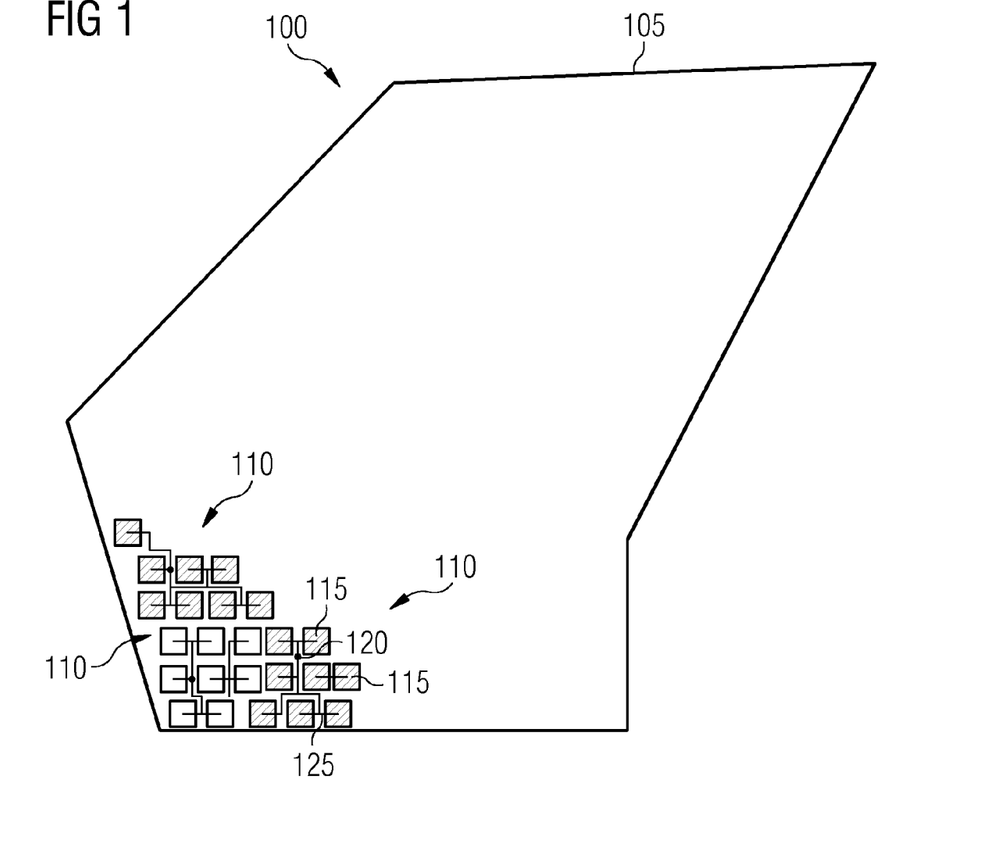
FIG. 1 shows a schematic representation of a photovoltaic installation.

FIG. 1 shows a schematic representation of a photovoltaic installation 100. On an available plot 105, units 110 are arranged, each of which includes a number of solar components 115. In the interests of clarity, only three units 110, each of which includes six solar components 115, are represented by way of an example. Each unit 110 is also associated with a transfer point 120.

In one form of embodiment, each solar component 115 includes one or more solar modules, each of which includes a manageable unit of solar cells, which are customarily arranged in a frame and are protected by a glazed cover panel. However, a solar component may also include a number of solar cells within a solar module or a number of solar modules. The function of the transfer point 120 is the hierarchical cascading of the units 110. All the solar components 115 in a unit 110 are connected by cables 125 to the transfer point 120. The transfer point 120 may be equipped with an electrical component for the conversion of the electrical energy generated by the unit 110, for example an inverter. Cabling for the interconnection of the transfer points 120 and the connection of further electrical components in the photovoltaic installation 100 is not represented in FIG. 1.

The photovoltaic installation 100 may include several tens, several hundred, or even several thousand units 110. For the planning of the photovoltaic installation 100, a number of different variants are run through, which are evaluated based on their technical properties and their associated construction and operating costs. In one phase, which will not be considered in greater detail here, the plot 105, the location of the solar components 115, the grouping thereof in units 110 and the location of the transfer points 120 are defined. Thereafter, the most advantageous cabling between the solar components 115 and the transfer points 120 for each unit 110 of the photovoltaic installation 100 is identified. In order to permit the run-through of different planning scenarios, the optimum routing of the cable 125 in each unit 110 is determined in the most efficient manner possible.

Figure 2A:
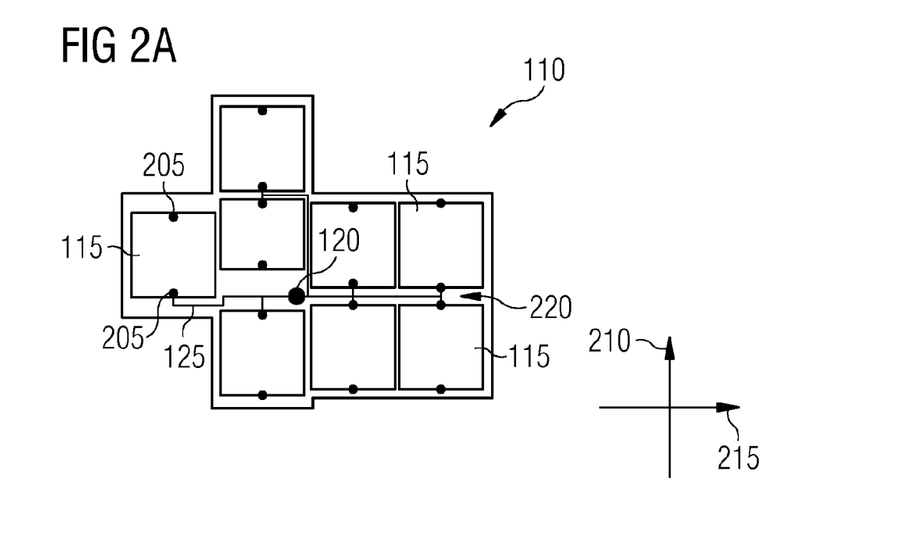
FIG. 2 shows different forms of representation of a unit in the photovoltaic installation represented in FIG. 1.

FIG. 2 shows different forms of representation of a unit 110 in the photovoltaic installation 100 represented in FIG. 1. FIG. 2A shows a schematic representation of an exemplary unit 110. Each solar component 115 is provided with two connections 205, which may be used alternatively for the connection of the solar components 115 to the transfer point 120 by a cable 125. The relative arrangement of the connections 205 on each solar component 115 is generally uniform and, in the example represented, the connections 205 are arranged opposite each other.

For the routing of the cable 125 within the unit 110, rules are provided. In the example represented, a first rule provides that the cable 125 is not to be routed below the solar components 115, but only outside the perimeter of the latter. Moreover, sections of the cable 125 are to be consistently routed in parallel to a first direction 210 or a second direction 215, the directions 210 and 215 being linearly independent. For example, the first direction 210 may follow a north-south orientation, and the second direction 215 may follow an east-west orientation. It may also be provided that the solar components 115, with respect to their connections 205, are to be oriented in the same direction, either all in the first direction 210, as represented, or all in the second direction 215. The solar components 115 are arranged with a specific clearance above the ground surface, in the interest of serviceability and the provision of sufficient mobility for the solar components 115 or units 110, where provision is made for the tracking of the position of the sun. From the connections 205, a cable 125 is routed vertically downwards to an embedded cable duct 220, which may accommodate one or more cables 125. As the provision of cable ducts 220 is associated with high costs, it is endeavored that the length of the cable ducts 220 is minimized to the greatest possible extent. In the interests of the minimization of line losses and cable costs, the cable 125 between each solar component 115 and the transfer point 120 is as short as possible. For the orientation of sections of the cable ducts 220, the above-mentioned rules may be applied.

Figure 2B:
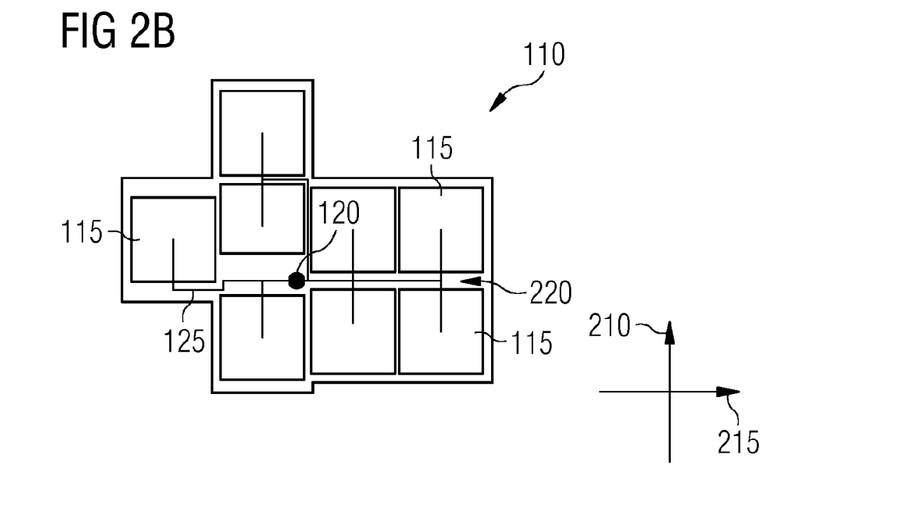

FIG. 2B shows the unit 110 represented in FIG. 2A, excluding the representation of the connections 205. In each case, the cable 125 is represented schematically up to the mid-point of the solar components 115. The initial routing of the cable 125, either upwards or downwards, indicates which connection 205 is to be used. The representation shown in FIG. 2B also forms the basis of that shown in FIG. 1.

Figure 3:
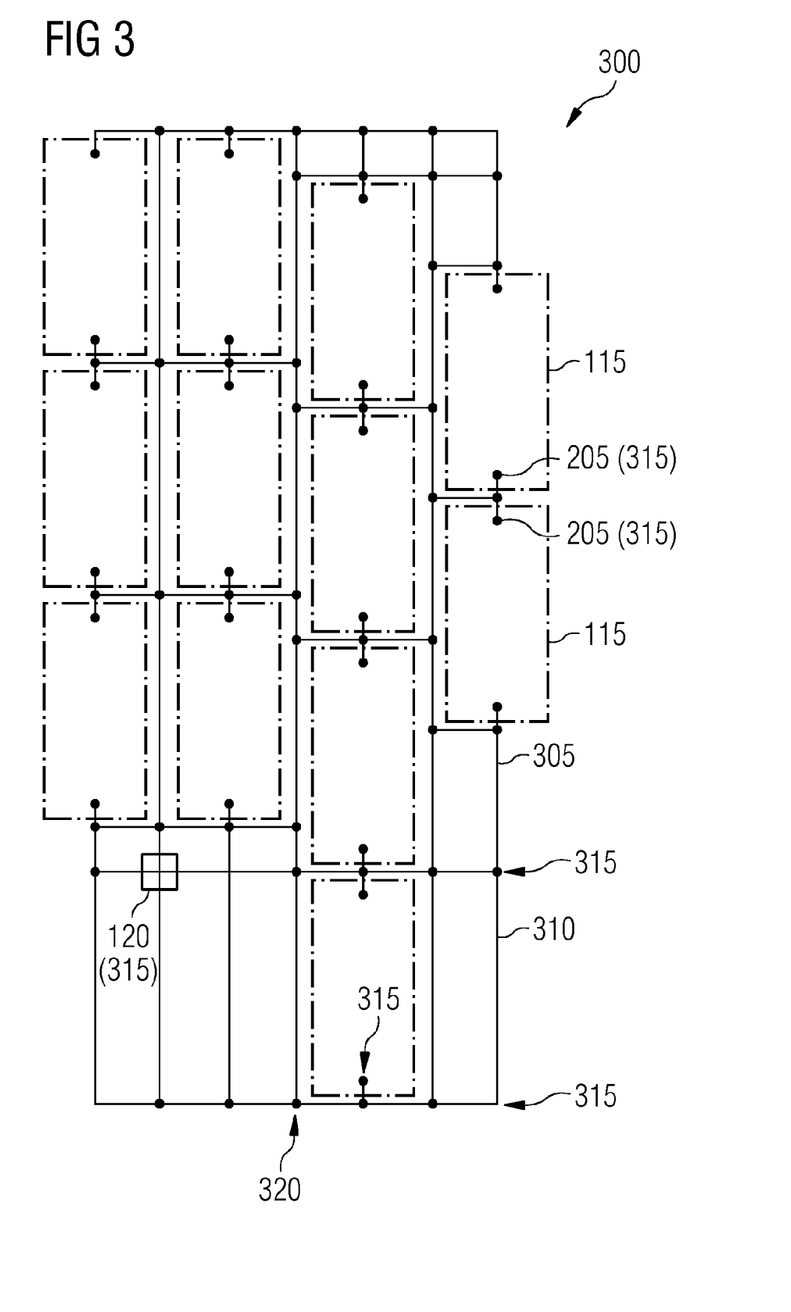
FIG. 3 shows a cabling chart for the photovoltaic installation represented in FIG. 1.

FIG. 3 shows a cabling chart 300 for a unit 110 of the photovoltaic installation 100 represented in FIG. 1. The dashed lines indicate the lateral boundaries of the solar components 115.

From each connection 205 of each unit 110, one edge 305 runs in each direction permitted by the rules. Each edge 305 is assigned an edge weight 310, which expresses the workload associated with the routing of the cable along the edge 305. Each edge 305 runs between two nodes 315. Between a source node 315 and an end node 315, a path 320 runs, which incorporates one or more edges 305. Hereinafter it is assumed that such a path 320 will be present in all cases (the cabling chart 300 is coherent), and only unlooped paths 320 are considered, such that each edge 305 in the cabling chart 300 occurs in one path 320 on no more than one occasion.

The transfer point 120 and the connections 205 respectively form the end nodes 315 of a path 320 which, in each case, represents a cable 125 or a cable duct 220. By known graph theory methods, a path 320 may be determined from the plurality of edges 305 for each solar component 115 that permits efficient cable routing between the solar component 115 and the transfer point 120. Accordingly, the quality of cable routing is determined with reference to the edge weights 310.

One edge 305 may be employed in a number of paths 320. This is also useful, on the grounds that a cable duct 220 routed along this edge 305 may be employed for a number of cables 125. This multiple employment may give rise to more "good" paths 320 than may be identified by the consideration of each path 320 in isolation. On the grounds of this mutual interaction, for the purposes of an exhaustive analysis of all the relevant paths 320, a substantial plurality of combinations of edges 305 are constituted and evaluated. By nature, this is an NP-incomplete problem, the resolution of which involves the application of a deterministic mechanism rather than polynomial processing capacity. According to one aspect, from the plurality of potential paths 320, a heuristic is initially applied for the selection of those that are promising and that, from the paths 320 thus selected, an optimization method is then applied for the selection of those which are to be included in an optimized solution.

Figure 4:
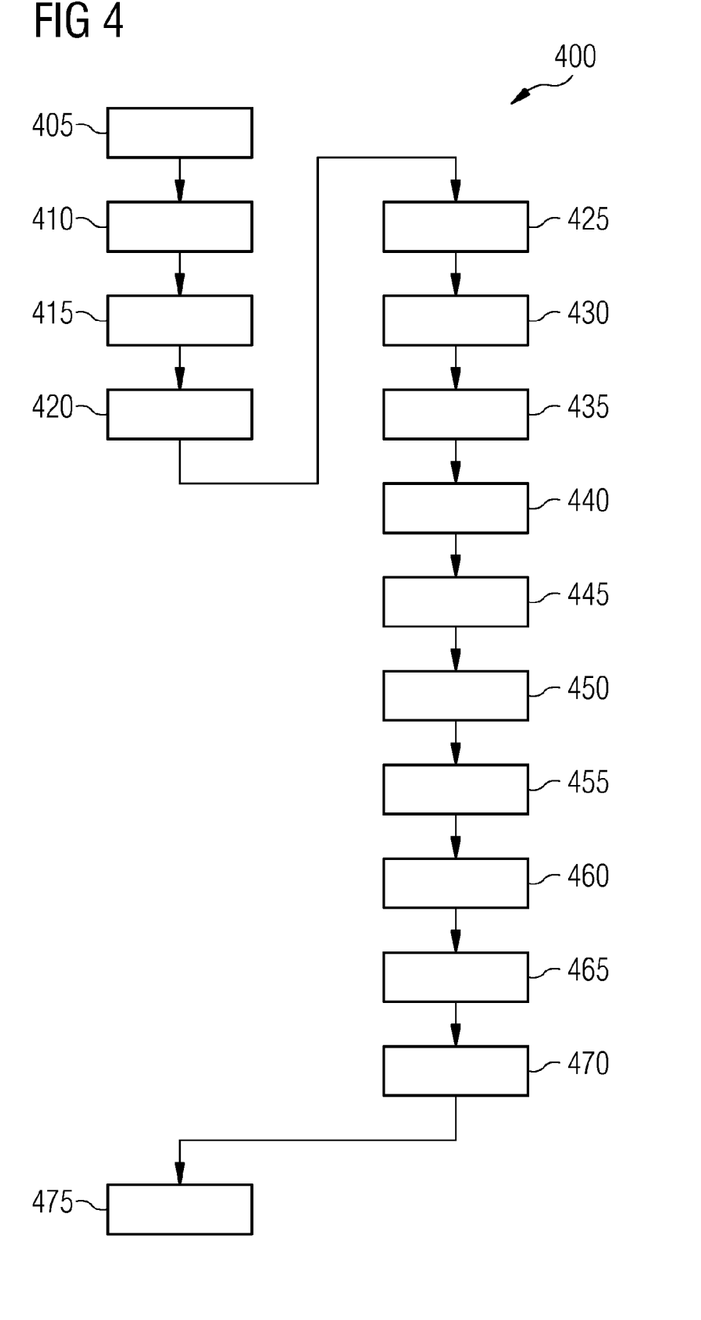
FIG. 4 shows a flowchart representing a method for the determination of a cabling of a unit in the photovoltaic installation represented in FIG. 1.

FIG. 4 shows a flowchart representing a method 400 for the determination of a cabling of a unit 110 in the photovoltaic installation 100 represented in FIG. 1. The method 400 may be executed for each of the units 110 in the photovoltaic installation 100. The method 400 is designed to run on a programmable computer.

In a first act 405, positions of the solar components 405 are recorded. In one act 410, positions of the connections 205 and of the transfer point 120 are recorded. In one act 415, rules for cable routing are recorded, in accordance with the exemplary rules described above with reference to FIG. 2. Thereafter, in one act 420, a cabling chart 300 is generated in accordance with the example shown in FIG. 3.

In the following acts 425 to 470, which may be executed for each of the solar components 115 in the unit 110, based on the cabling chart 300 for each solar component 115, one or more paths 320 between the solar component 115 and the transfer point 120 are selected that, according to a predetermined evaluation, are classified as promising. For each of the methods applied in conjunction with acts 425 to 470, a promising path 320 of this type may be determined. For each connection between the transfer point 120 and each solar component 115, one or more preferred paths 320 are determined. To this end, the approach described hereinafter for the determination of preferred paths 320 is purely exemplary and optional.

In act 425, the edge weights 310 of the edges 305 are determined based on the Euclidian distances of the points represented by the nodes 315. The positions from acts 405 and 410 are applied for this purpose. Thereafter, in act 430, a shortest path 320 between the solar component 115 and the transfer point 120 is determined by the application of Dijkstra's algorithm, or one of the variations or extensions thereof. This algorithm determines the shortest path 320 between specified nodes 315 in the cabling chart 300, based on the specified edge weights 310.

In act 435, the edge weights applied in act 425 are adjusted to the effect that, for each edge 305, the distance from the latter to the transfer point 120 in the first direction 210 is considered in addition. The subsequent determination of a shortest path 320 based on these edge weights in act 440 proceeds in accordance with act 430.

In a similar manner, act 445 involves the adjustment of the edge weights from act 425 to incorporate the distances from the edges 305 to the transfer point 120 in the second direction 215. The determination of the shortest path 320 in act 450 corresponds to that described in acts 430 or 440.

In act 455, the adjustments from both act 435 and from act 445 are applied to the edge weights from act 425. In act 460, in the manner described, a shortest path 320 is then determined based on the combined edge weights 310.

In act 465, the edge weights 310 determined in one of the previous acts 425 to 460 are adjusted by the application of an additional penalizing term (malus) to those edges 305 that lie in the vicinity of an adjoining unit 110. In act 470, a shortest path 320 is again determined by the application of Dijkstra's algorithm.

In a concluding act 475, for each solar component 115, the number of paths 320 available for the routing of a cable 125 is at least equal to the number of heuristics applied in acts 425 to 470. In one embodiment, from the quantity of paths 320 determined, duplicates and equivalents may be discarded. Thereafter, optimization is undertaken for the determination of one path 320 for each solar component 115, based on the quantity of edges 305 determined. This optimization may be executed using linear integer optimization or mixed-integer programming. To this end, an exact solution method, such as branch-and-bound, the cutting-plane method, or branch-and-cut, or any other heuristic may be applied for the execution of non-exhaustive optimization. In the latter case, optimization may be interrupted after a specified time, such that at least a partially optimized solution is achieved. For each solar component 115 in the unit 110, the solution determined includes one path 320 from one connection 205 on the solar component 115 to the transfer point 120, in accordance with cable routing regulations.

For the evaluation of the quality of a given combination of paths 320 during the optimization process in act 475, different metrics may be applied.

Figure 5A:
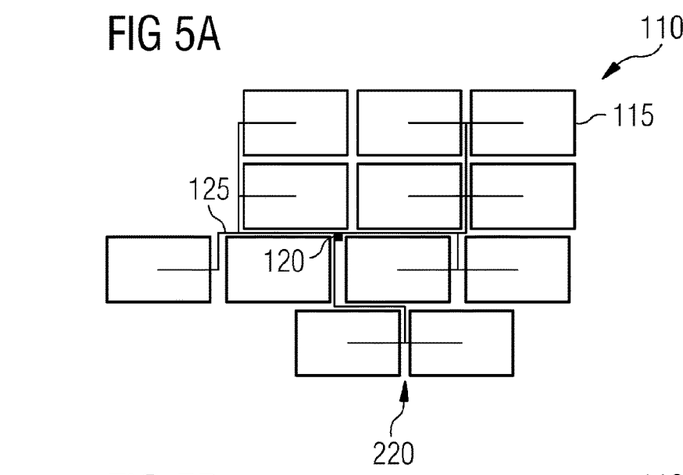
FIG. 5 shows various exemplary results of the method represented in FIG. 4.
Figure 5B:
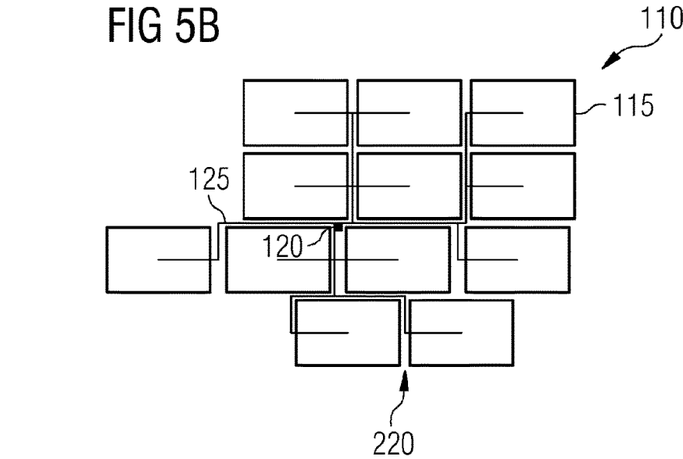
Figure 5C:
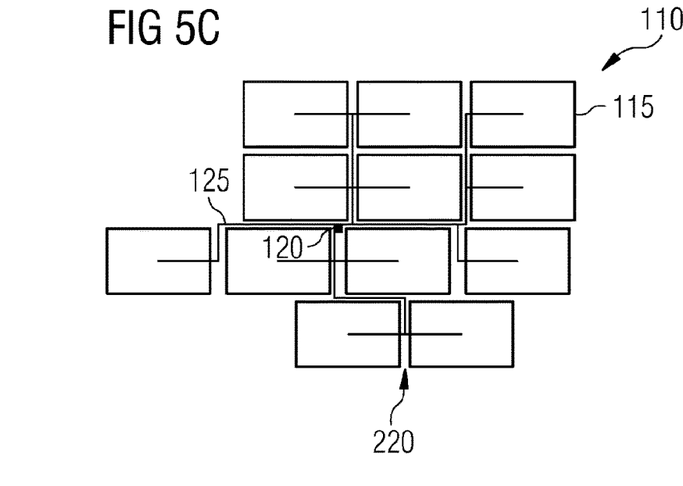

FIG. 5 shows various exemplary results of the method 400 described in FIG. 4, with the application of different metrics. FIG. 5A shows the result for a minimization of the length of cable ducts 220. FIG. 5B shows one cable route, in which the sum of the lengths of the cable 125 between the solar component 115 and the transfer point 120 has been minimized. FIG. 5C shows the result of optimization with respect to both criteria in FIGS. 5A and 5B. The criteria in FIGS. 5A and 5B may be combined in a weighted sum, in which a heavier weighting is applied to that criterion, the optimization of which is to be given higher priority.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method cabling of a unit in a photovoltaic installation, wherein the unit comprises a number of solar components configured to generate electrical energy and a single transfer point configured to convert the electrical energy generated by the solar components, the single transfer point being a connection point that is separate and distinct from the solar components, and wherein the single transfer point is configured to directly connect to each solar component of the number of solar components via a cable and to connect the unit to one or more other units in the photovoltaic installation, wherein each of the one or more other units comprises an additional number of solar components and an additional transfer point, the method comprising:
generating, by a processor, a cabling chart with paths for routing cable between a connection of each solar component and the single transfer point, in accordance with cable routing regulations;
determining, by the processor, based on the cabling chart, a plurality of paths for routing cable between each solar component and the single transfer point;
selecting, by the processor, one path of the plurality of paths for routing cable determined for each solar component such that a workload associated with routing cable along the selected path is minimized;
displaying, by a display, the cabling chart of the unit, the displayed cabling chart including the positions of the solar components, the position of the single transfer point, and the position of the selected path for routing cable between each solar component and the single transfer point; and
storing the displayed cabling chart, which includes the positions of the solar components, the position of the single transfer point, and the position of the selected path for routing cable,
wherein the workload is determined based on a sum of the lengths of the selected paths and the length of a cable duct in which the cabling is routed, either individually or in a bundled arrangement.

2. The method of claim 1, wherein the solar components are provided with a number of alternative connections and the cabling chart is plotted between all of the alternative connections and the single transfer point.

3. The method of claim 1, further comprising routing edges of the paths either in a first direction or in a second direction.

4. The method of claim 1, wherein determining the paths comprises determining a shortest path in relation to edge weights of edges on the path.

5. The method of claim 4, further comprising determining the edge weights based on a Euclidian distance with respect to end points.

6. The method of claim 5, wherein determining the edge weights comprises determining the edge weights based on edge lengths arranged in a first direction.

7. The method of claim 6, wherein determining the edge weights comprises determining the edge weights based on edge lengths arranged in a second direction.

8. The method of claim 4, wherein an edge weight is subject to an additional penalty, and wherein an edge lies within an area that borders the unit.

9. The method of claim 1, wherein selecting one of the paths comprises implementing mixed-integer optimization.

10. The method of claim 9, wherein selecting one of the paths comprises implementing an exact optimization method.

11. The method of claim 10, wherein the exact optimization method is branch-and-bound, the cutting-plane method, or branch-and-cut.

12. A computer program product to implement a method for cabling of a unit in a photovoltaic installation, wherein the unit comprises a number of solar components configured to generate electrical energy and a single transfer point configured to convert the electrical energy generated by the solar components, the single transfer point being a connection point that is separate and distinct from the solar components, and wherein the single transfer point is configured to directly connect to each solar component of the number of solar components via a cable and to connect the unit to one or more other units in the photovoltaic installation, wherein each of the one or more other units comprises an additional number of solar components and an additional transfer point, the computer program product comprising one or more non-transitory computer-readable storage media having stored thereon instructions executable by one or more processors of a computing system to cause the computing system to perform operations comprising:

generating a cabling chart with paths between a connection of each solar component and the single transfer point in accordance with cable routing regulations;

determining, based on the cabling chart, paths between each solar component and the single transfer point;

selecting one of the paths determined for each solar component such that a workload associated with the cabling of the unit is minimized;

displaying, by a display, the cabling chart of the unit, the displayed cabling chart including the positions of the solar components, the position of the single transfer point, and the position of the selected path for each solar component; and storing the displayed cabling chart, which includes the positions of the solar components, the position of the single transfer point, and the position of the selected path for routing cable, wherein the workload is determined based on a sum of the lengths of the selected paths and the length of a cable duct in which the cabling is routed, either individually or in a bundled arrangement.

13. The computer program product of claim 12, wherein the solar components are provided with a number of alternative connections and the cabling chart is plotted between all of the alternative connections and the single transfer point.

14. The computer program product of claim 13, wherein the operations further comprise routing edges of the paths either in a first direction or in a second direction.

15. The computer program product of claim 14, wherein determining the paths comprises determining a shortest path in relation to edge weights of edges on the path.

16. The computer program product of claim 12, wherein selecting one of the paths comprises implementing an exact optimization method.

\* \* \* \* \*

UNITED STATES PATENT AND TRADEMARK OFFICE
CERTIFICATE OF CORRECTION

PATENT NO. : 10,680,551 B2
APPLICATION NO. : 14/772645
DATED : June 9, 2020
INVENTOR(S) : Petra Bauer et al.

Page 1 of 1

It is certified that error appears in the above-identified patent and that said Letters Patent is hereby corrected as shown below:

In the Claims

In Claim 1 Line 59:
"A method cabling of a unit in a photovoltaic installa-"
Should be replaced with:
"A method for cabling of a unit in a photovoltaic installa-"

Signed and Sealed this
Eighth Day of September, 2020

Andrei Iancu
*Director of the United States Patent and Trademark Office*